J. PHILLIPS.
PLOW.

No. 170,764.

Patented Dec. 7, 1875.

WITNESSES:
E. Wolff
Alex F. Roberts

INVENTOR:
J. Phillips
BY
ATTORNEYS.

UNITED STATES PATENT OFFICE.

JOSEPH PHILLIPS, OF SMITHTON, ILLINOIS.

IMPROVEMENT IN PLOWS.

Specification forming part of Letters Patent No. 170,764, dated December 7, 1875; application filed October 8, 1875.

*To all whom it may concern:*

Figure 1:
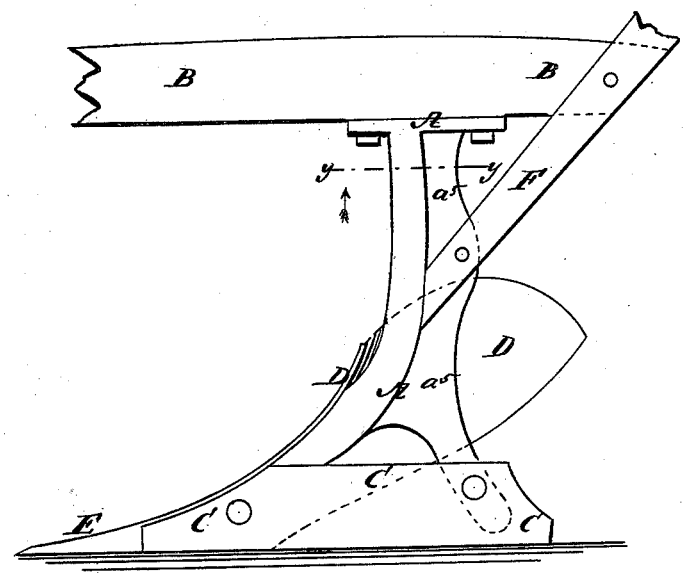
Figure 2:
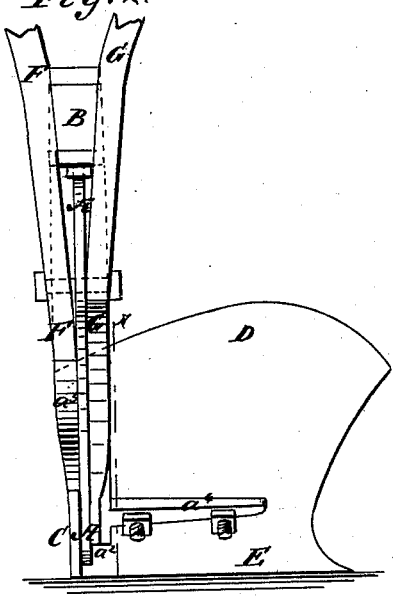
Figure 3:
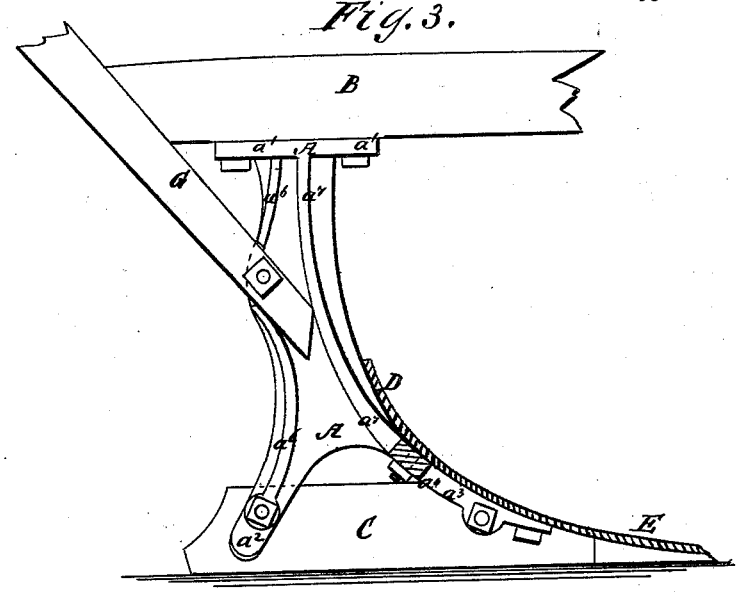
Figure 4:
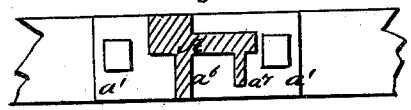

Be it known that I, JOSEPH PHILLIPS, of Smithton, in the county of St. Clair and State of Illinois, have invented a new and useful Improvement in Plows, of which the following is a specification:

Figure 1 is a side view of my improved plow, the forward part of the beam and the upper part of the handles being broken away. Fig. 2 is a rear view of the same. Fig. 3 is a vertical section of the same, taken through the line $x\ x$, Fig. 2. Fig. 4 is a cross-section of the upright, taken through the line $y\ y$, Fig. 1.

Similar letters of reference indicate corresponding parts.

The object of this invention is to furnish an improved cast-iron upright for plows, which shall be light, strong, and durable, and convenient and reliable in use, holding the land-side, mold-board, and share securely and firmly.

The invention consists in the plow-upright having a flange formed upon its upper end, having its lower end forked or widened, and a horizontal prong or arm formed upon it, having a longitudinal rabbet formed upon the rear part of its land-side, and two longitudinal flanges formed upon its mold-board side, as hereinafter fully described, to adapt it to receive the beam, the land-side, the mold-board, the share, and the handles, as set forth.

A is the upright, the upper end of which has a flange or cross-head, $a^1$, formed upon it to rest against the beam B, and receive the bolts by which it is secured to the said beam B. The lower end of the upright A is forked or widened, and in its ends or corners $a^2\ a^3$ are formed holes to receive the bolts by which the land-side C is secured to it. Upon the forward prong or part $a^3$ of the lower end of the upright A is formed a horizontal prong or arm, $a^4$, in which are formed holes to receive the bolts that secure the mold-board D and the share E to it. The mold-board D and share E are also secured to the forward part or prong of the lower end of the upright A by bolts passing through the said part or prong. The land-side side of the upright A has a rabbet, $a^5$, formed in its rear part to receive the land-side handle F, which is bolted to said upright, and the end of which rests against the shoulder of said rabbet. The mold-board side of the upright A has two longitudinal flanges, $a^6\ a^7$, formed upon it near its front and rear edges to make it strong, and at the same time enable it to be made light. The rear flange $a^6$ is notched to receive the end of the mold-board side handle G, which rests against the forward flange $a^6$, and is bolted to the upright A by the same bolt that secures the other handle F. The handles F G are also bolted to the rear end of the beam B.

This construction enables the upright to be made light, and at the same time strong, and also enables the land-side C, the mold-board D, and the share E to be conveniently secured to said upright, and to be firmly and securely held.

Having thus described my invention, I claim as new and desire to secure by Letters Patent—

The plow-upright A, having a flange, $a^1$, formed upon its upper end, having its lower end $a^2\ a^3$ forked or widened, and a horizontal prong or arm, $a^4$, formed upon it, having a longitudinal rabbet, $a^5$, formed upon the rear part of its land-side side, and two longitudinal flanges, $a^6\ a^7$, formed upon its mold-board side, substantially as herein shown and described, to adapt it to receive the beam B, the land-side C, the mold-board D, the share E, and the handles F G, as set forth.

JOSEPH PHILLIPS.

Witnesses:
A. S. WILDERMANN,
BENJ. BONEAU.